(12) United States Patent
Suarez et al.

(10) Patent No.: US 8,295,492 B2
(45) Date of Patent: Oct. 23, 2012

(54) AUTOMATED KEY MANAGEMENT SYSTEM

(75) Inventors: Luis A. Suarez, Concord, NC (US); Neil Kauer, Belmont, NC (US); Tim Gray, Concord, NC (US); David Badia, Charlotte, NC (US); Vijay Ahuja, Raleigh, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 810 days.

(21) Appl. No.: 11/473,665

(22) Filed: Jun. 23, 2006

(65) Prior Publication Data

US 2006/0291664 A1    Dec. 28, 2006

Related U.S. Application Data

(60) Provisional application No. 60/694,270, filed on Jun. 27, 2005.

(51) Int. Cl.
*H04L 9/08* (2006.01)
*G06F 11/30* (2006.01)

(52) U.S. Cl. ........................ 380/286; 713/189

(58) Field of Classification Search ................. 380/277, 380/286; 713/189, 15, 150
See application file for complete search history.

(56) References Cited

U.S. PATENT DOCUMENTS

| | | | |
|---|---|---|---|
| 4,941,176 A | 7/1990 | Matyas et al. | |
| 5,200,999 A * | 4/1993 | Matyas et al. | 380/277 |
| 5,604,801 A | 2/1997 | Dolan et al. | 380/21 |
| 5,841,865 A * | 11/1998 | Sudia | 380/286 |
| 6,035,402 A | 3/2000 | Vaeth et al. | 713/201 |
| 6,393,563 B1 | 5/2002 | Maruyama et al. | 713/155 |
| 6,530,020 B1 | 3/2003 | Aoki | 713/163 |
| 6,636,968 B1 | 10/2003 | Rosner et al. | |
| 6,748,528 B1 | 6/2004 | Greenfield | 713/151 |
| 6,760,441 B1 | 7/2004 | Ellison et al. | |
| 6,782,103 B1 * | 8/2004 | Arthan et al. | 380/278 |
| 6,802,002 B1 | 10/2004 | Corella | 713/175 |
| 6,834,112 B1 | 12/2004 | Brickell | 380/279 |
| 6,880,081 B1 | 4/2005 | Itkis | 713/163 |
| 6,904,524 B1 | 6/2005 | Jaeger, Jr. et al. | 713/176 |
| 6,915,434 B1 | 7/2005 | Kuroda et al. | |
| 7,093,133 B2 | 8/2006 | Hopkins et al. | |
| 7,209,563 B1 * | 4/2007 | Calvez et al. | 380/278 |
| 2001/0026619 A1 * | 10/2001 | Howard et al. | 380/279 |
| 2001/0034836 A1 | 10/2001 | Matsumoto et al. | 713/176 |
| 2002/0018570 A1 * | 2/2002 | Hansmann et al. | 380/270 |
| 2002/0026575 A1 | 2/2002 | Wheeler et al. | 713/156 |
| 2002/0071561 A1 * | 6/2002 | Kurn et al. | 380/277 |
| 2002/0078355 A1 | 6/2002 | Samar | 713/176 |

(Continued)

OTHER PUBLICATIONS

Zheng et al. U.S. Patent Application, Cryptographic Key Backup and Escrow System, U.S. Appl. No. 11/019,069, filed Dec. 21, 2004.

(Continued)

*Primary Examiner* — Nathan Flynn
*Assistant Examiner* — Abdullah Almamun
(74) *Attorney, Agent, or Firm* — K&L Gates LLP (57) ABSTRACT

A system for automated cryptographic key management comprises a key control system, a key management agent system, and a key system application program interface. A method for automated cryptographic key management is also disclosed. The method comprises the automatic generation of cryptographic keys by the key control system and distribution of such keys by the key control system to the key management agent system.

20 Claims, 8 Drawing Sheets

U.S. PATENT DOCUMENTS

| | | | |
|---|---|---|---|
| 2002/0120840 A1 | 8/2002 | Yellepeddy et al. | 713/156 |
| 2002/0144109 A1 | 10/2002 | Benantar et al. | 713/156 |
| 2002/0154782 A1 | 10/2002 | Chow et al. | 380/278 |
| 2003/0076959 A1* | 4/2003 | Chui | 380/277 |
| 2003/0081789 A1 | 5/2003 | Numao et al. | 380/278 |
| 2003/0138105 A1 | 7/2003 | Challener et al. | |
| 2003/0154376 A1 | 8/2003 | Hwangbo | 713/173 |
| 2003/0163700 A1 | 8/2003 | Paatero | 713/175 |
| 2003/0237004 A1 | 12/2003 | Okamura | 713/201 |
| 2004/0001595 A1* | 1/2004 | Hopkins et al. | 380/277 |
| 2004/0039925 A1* | 2/2004 | McMillan et al. | 713/189 |
| 2004/0054913 A1 | 3/2004 | West | 713/186 |
| 2004/0068650 A1 | 4/2004 | Resnitzky et al. | 713/155 |
| 2004/0109567 A1* | 6/2004 | Yang et al. | 380/277 |
| 2004/0109568 A1* | 6/2004 | Slick et al. | 380/277 |
| 2004/0151317 A1* | 8/2004 | Hyyppa et al. | 380/277 |
| 2004/0151319 A1 | 8/2004 | Proudler | |
| 2005/0069136 A1* | 3/2005 | Thornton et al. | 380/277 |
| 2005/0097316 A1 | 5/2005 | Kim | 713/163 |
| 2005/0114689 A1* | 5/2005 | Strom et al. | 713/193 |
| 2005/0138374 A1 | 6/2005 | Zheng et al. | 713/166 |
| 2006/0004792 A1 | 1/2006 | Lyle et al. | |
| 2006/0188099 A1* | 8/2006 | Kondo et al. | 380/277 |
| 2007/0230704 A1* | 10/2007 | Youn et al. | 380/277 |
| 2008/0019526 A1* | 1/2008 | Fu et al. | 380/277 |
| 2008/0181408 A1* | 7/2008 | Hird | 380/277 |

OTHER PUBLICATIONS

Zehng et al. U.S. Patent Application, Public Key Encryption for Groups, U.S. Appl. No. 11/022,491, filed Dec. 22, 2004.

Suarez U.S. Patent Application, A Method of Securing a Digital Signature, U.S. Appl. No. 11/487,272, filed Jul. 14, 2006.

PCT International Search Report, PCT/US04/43283, filed Dec. 22, 2004.

PCT International Search Report, PCT/US06/25027, filed Jun. 26, 2006.

* cited by examiner

AUTOMATED KEY MANAGEMENT SYSTEM

CROSS-REFERENCE TO RELATED APPLICATION

This application is entitled to the benefit of, and claims priority to provisional U.S. patent application Ser. No. 60/694,270, filed on Jun. 27, 2005, which is incorporated herein by reference in its entirety.

FIELD OF THE INVENTION

The present invention relates generally to cryptographic key management, and, in particular, to a system for automated cryptographic key management.

BACKGROUND OF THE INVENTION

Institutions such as banks and retail establishments often conduct business electronically, for example, through the use of the internet. Thus, such institutions and their customers require a secure environment that has the capability of managing cryptographic keys. Cryptographic keys are one form of information technology security.

Examples of cryptographic keys include symmetric keys and asymmetric keys. Symmetric keys may be used, for example, for encryption of data. Symmetric encryption involves using a single shared key among all users communicating with one another. A message is locked (encrypted) with a key and then the same key is used to unlock (decrypt) the message. In order to protect a message when using symmetric encryption, it is vital to have a secure method to exchange the secret key to all users.

Asymmetric keys may be used, for example, for both encryption and authentication. Asymmetric encryption involves using a key pair to secure information. A key pair is comprised of a private key (decryption key), which is known only to a single user or a limited group of users, and a public key (encryption key), which may be known by anyone. In order to encrypt and decrypt a message, both the private key and public key of the key pair must be used. For example, a message will be encrypted by a sender using the public key of the intended recipient of the message. Once the recipient receives the encrypted message, his or her private key is used to decrypt the message.

A problem with the use of symmetric keys is that they must be changed or rotated periodically because they become more vulnerable to attack the more they are used. However, even the use of asymmetric keys (such as private keys, public keys, and certificates) requires a change control and in most instances requires an application to be recycled to pick up a new key. In current systems, all keys whether symmetric or asymmetric are rotated manually. The manual key delivery process is insecure and error prone. There is also need for a cryptographic key management system that supports asymmetric keys used for rotation as well as asymmetric keys used for authentication such as with a certificate authority.

There is also a need for a system that provides a simple and secure way for both middleware and mainframe applications to automatically store and retrieve keys. The term "middleware application" refers to a non-mainframe application (web-app, web-service, and the like), such as a log in application for authenticating users. The term "mainframe application" refers to an application residing on a mainframe, such as a credential managers that might be called by the log in application to validate a password.

Thus, the need exists for a simple and secure system that provides all of the functionality and security features described above, but also includes automated key distribution and rotation that is suitable for both symmetric and asymmetric keys without data, performance, or functionality loss. There is also a need for a computer or software application to securely obtain and rotate keys for use with secure communication with partner applications.

SUMMARY OF THE INVENTION

The present invention relates to a system for automated cryptographic key management. The system comprises a key control system, a key management agent system, and a key system application program interface.

The present invention also relates to a method for automated cryptographic key management. The method comprises the automatic generation of cryptographic keys by the key control system and the automatic distribution of such keys by the key control system to the key management agent system.

The system of the present invention is suitable for use with both symmetric and asymmetric keys. An advantage of the system of the present invention over existing systems using asymmetric keys, for example, is that the system of the present invention supports rotation of asymmetric keys used for encryption as well as rotation of asymmetric keys used for authentication, such as with a certificate authority.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION OF THE PREFERRED EMBODIMENTS

The automated key management system of the present invention is a system that has the capability to manage symmetric and asymmetric (public/private) encryption keys. This system involves the automatic distribution, rotation, and renewal of such keys.

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

Figure 1:
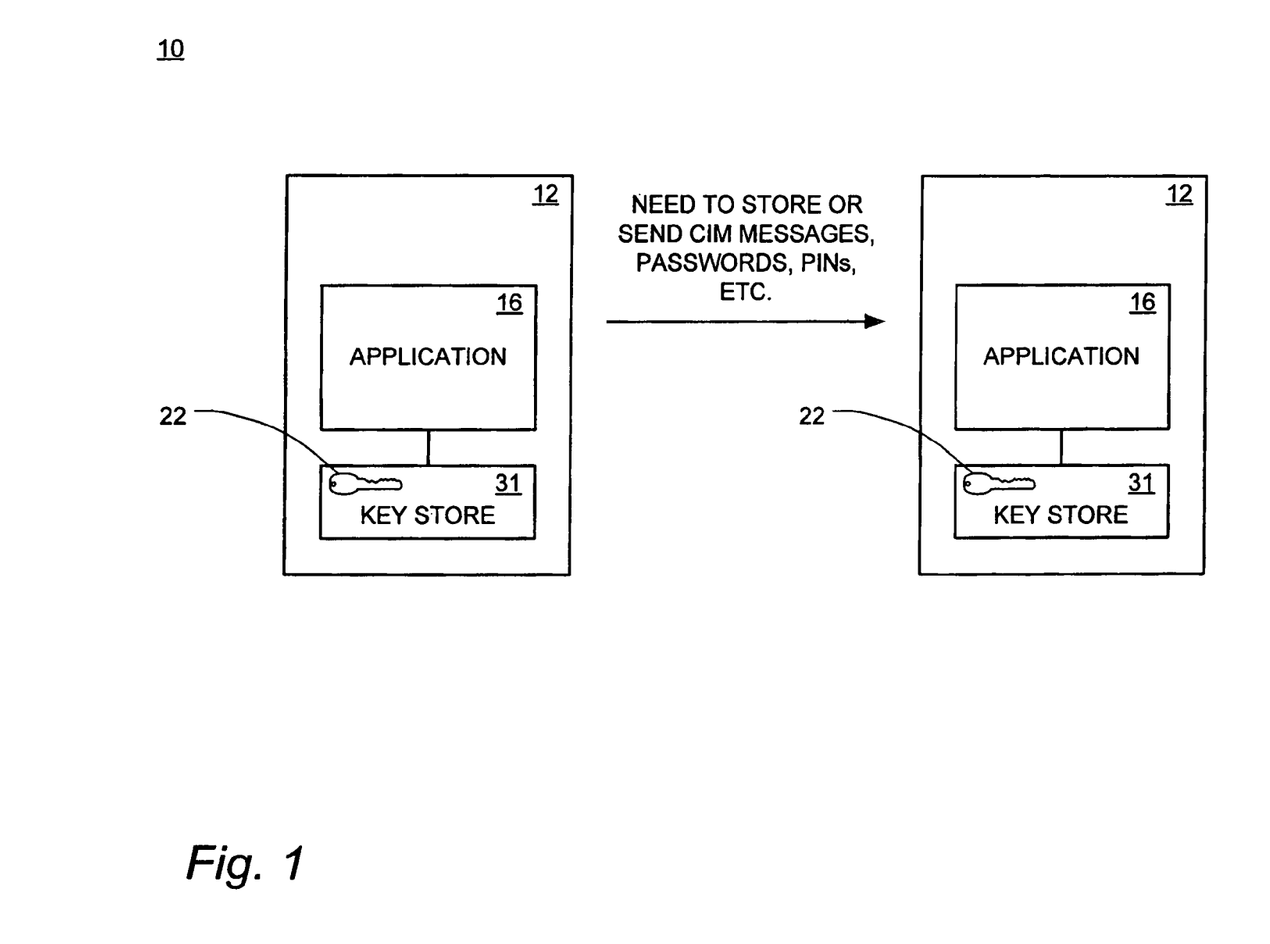
FIG. 1 is a block diagram illustrating the environment in which the system of the present invention operates.

FIG. 1 is a block diagram illustrating the environment 10 in which the system 20 (shown in FIG. 2) of the present invention operates. Applications 16 on distributed servers 13, mainframes 14, or other computing machines 12 often need to store or send passwords, personal identification numbers ("PINs"), and the like to applications 16 on other similar machines 12. Due to the sensitivity of the data, this transfer must be secured, typically using keys 22 of various types. The keys 22 must be accessible to the respective applications 16 and are present in a key store 31. A key store 31, as used herein, is a secure file where data keys 22 are stored. When an application requires a new key 22, it merely retrieves it from its designated key store 31.

Preferably, at least one key store 31 is provided for each application on a machine 12. The use of individual key stores 31 allows enhanced security by putting access controls, such as operating system read rights, on each key store 31. This prevents one application 16 from seeing the keys 22 belonging to another application 16. The use of individual key stores 31 also allows secure key management in "hoteled" environments, where many applications may execute on a single physical server 12. However, if desired, a lower-security system may be provided through the use of a single key store 31 by multiple applications 16.

Generally, the application 16 remains unaware of how the keys 22 reached the key store 31; the functions of loading, tracking and backing up the keys 22 are all performed without any interaction with the application 16. These tasks have traditionally been carried out manually, wherein an operator manually ports the keys 22 to the machine 12 using a portable data storage means, such as a floppy disk or the like. The present invention, however, utilizes an automated key management system 20, described and illustrated hereinbelow, that automates the distribution and rotation of all keys 22, including both symmetric and asymmetric ones.

Figure 2:
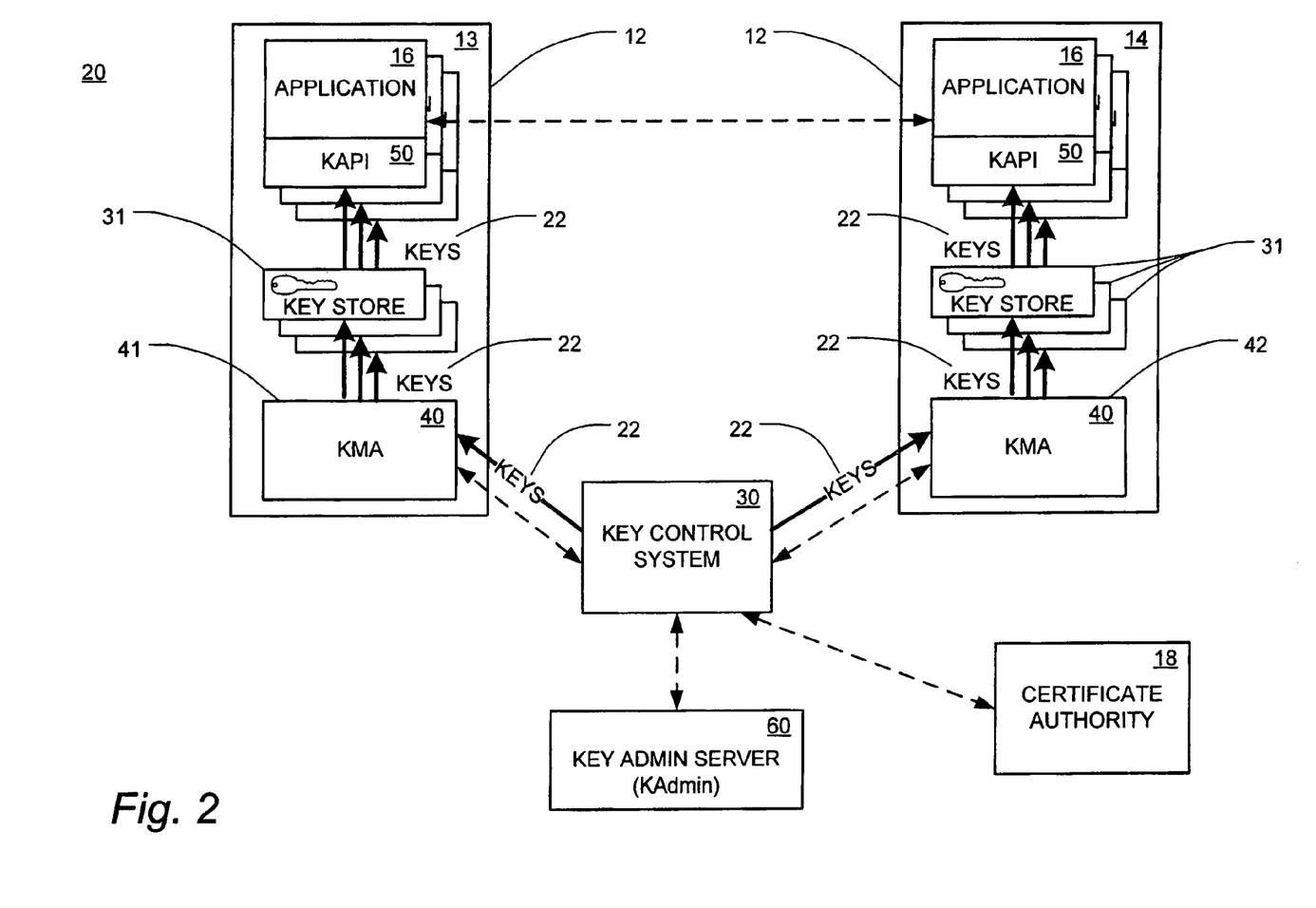
FIG. 2 is a block diagram of an automated key management system in accordance with the preferred embodiments of the present invention.

FIG. 2 is a block diagram of an automated key management system 20 in accordance with the preferred embodiments of the present invention. The system 20 allows applications 16 on any combination of distributed servers 13, mainframes 14, or other computing machines 12 to obtain keys 22 for both encrypting sensitive data and decrypting received encrypted data from key stores 31 where the keys 22 are stored. More particularly, the system 20 is capable of generating and distributing the keys 22, securely storing the keys 22, and rotating or refreshing the keys 22. The system 20 primarily comprises: a key control system 30, a key management agent ("KMA") system 40, a key system application program interface ("key system API") 50, and an administrative interface ("KAdmin") 60. Each of these will be described in greater detail below.

The key control system 30 is the core of the system 20. A primary function of the key control system 30 is to generate and then distribute or "publish" keys 22 to the key management agent system 40. However, the key control system 30 interacts with both the key management agent system 40 and the administrative interface 60, receiving instructions from the administrative interface 60 and instructing the key management agent system 40 to perform certain functions.

Figure 3:
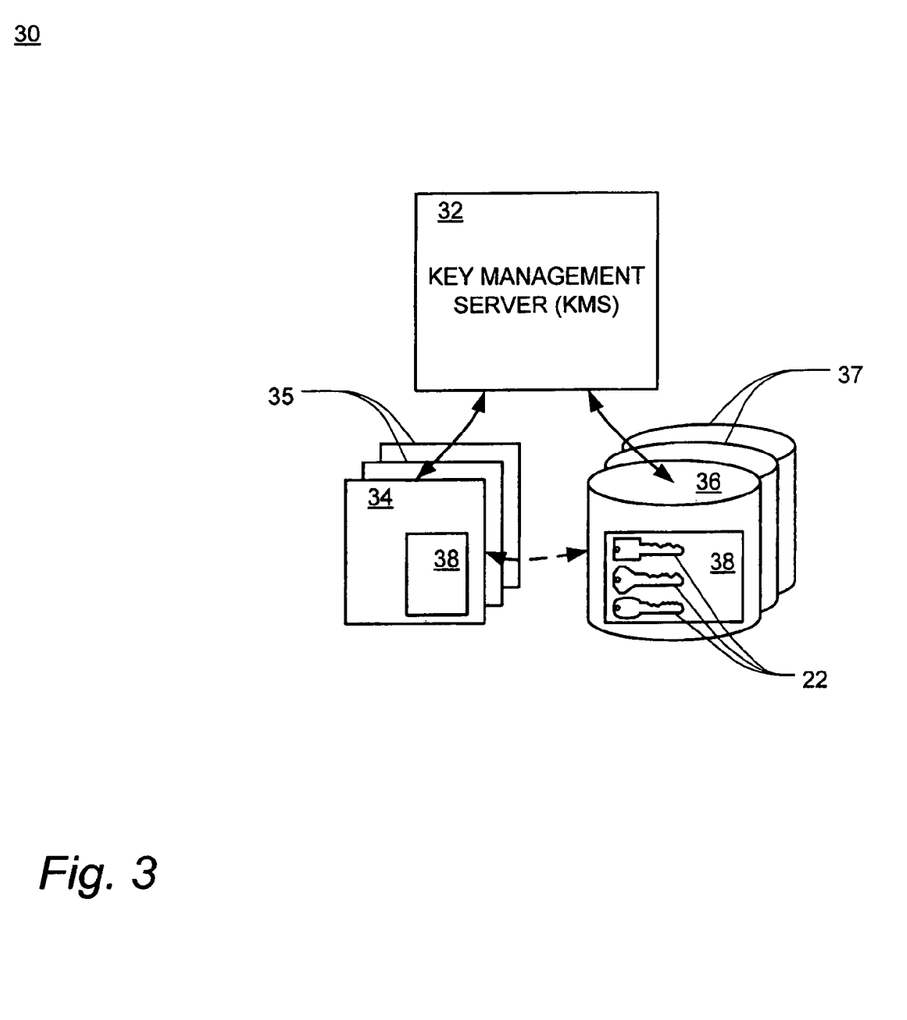
FIG. 3 is a block diagram of the key control system of FIG. 2.

FIG. 3 is a block diagram of the key control system 30. The key control system 30 preferably comprises a key management server ("KMS") 32, a separate, dedicated, secure hardware device 34, a database system 36, a common library (not shown) used for logging and configuration purposes, a cryptographic library (not shown), and a local property or configuration file (not shown), as well as a collection of key data 38. The key management server 32, which may be developed in Java version 1.2 or greater, is communicatively connected to the various servers 12 shown in FIG. 2 and is arranged to generate and distribute application keys 22 from the database system 36 to the applications 16 running on those machines 12. The application keys 22 may be symmetric or asymmetric in form. The database system 36 preferably stores or escrows at least a portion of the key data 38, including the application keys 22, which are preferably stored in encrypted form. The hardware device 34 preferably stores another portion of the key data 38 and houses the scrambling and descrambling functionality of the key control system 30. More particularly, the hardware device 34 preferably stores one or more master keys (not shown) that are used to scramble and descramble application keys 22 (or to scramble and descramble intermediate keys, which in turn are used to scramble and descramble application keys 22).

The interface between the key control system 30 and the key management agent system 40 may be based on XML messages sent between the key management server 32 and the key management agent system 40, where each connection is preferably secured by Secure Socket Layers ("SSL"). Oracle Corporation, of Redwood Shores, Calif., offers database systems 36 suitable for use with the preferred embodiments of the present invention. The interface to the database system 36 is preferably through a Java-Oracle driver and is secured using Internal Protocol Security ("IPSec"). A common library suitable for use with the preferred embodiments of the present invention may be easily developed by one of ordinary skill in the art. A cryptographic library suitable for use with the preferred embodiments of the present invention is RSA Security's cryptographic library.

A key control system 30 including these components and methodology and suitable for use in the preferred embodiments of the present invention is described in commonly-assigned U.S. patent application Ser. No. 11/019,069, the entirety of which is incorporated herein by reference. However, it will appear that other types of key control systems may alternatively be used without departing from the scope of the present invention.

The key management agent system 40 includes a plurality of key management agents ("KMAs") 41, 42. A separate key management agent 41, 42 is preferably disposed on each machine 12 that is to communicate with the key control system 30. A key management agent 41 referred to as a "distributed" key management agent is located on each distributed server-type machine 13, while a key management agent 42 referred to as a "mainframe" key management agent is located on each mainframe-type machine 14. Each key management agent 41, 42 in the key management agent system 40 is a standalone service which waits for instructions from the key management server 32 of the key control system 30 and updates its respective key stores 31 as necessary. It may also performs maintenance on its key stores 31, such as regenerating passwords for protecting the key stores 31 or the like, again as instructed by the key management server 32.

Each distributed key management agent 41 preferably includes, in addition to one or more software modules, a common library (not shown) used for logging and configuration purposes, a cryptographic library (not shown) and a local property or configuration file (not shown). Each key management agent 41, which may be developed in Java version 1.4, communicates locally with its own property file and its obfuscated key store 31. The functionality between the distributed key management agent 41 and the key management server 32 involves commands sent to the key management server 32, providing the key management server 32 with results from key management server-sent instructions. The interface between each distributed key management agent 41 and the key management server 32 is based on XML messages sent between the two components, where each connection is secured by SSL. A common library suitable for use with the preferred embodiments of the present invention may be easily developed by one of ordinary skill in the art. A cryptographic library suitable for use with the preferred embodiments of the present invention is RSA Security's cryptographic library.

The mainframe key management agents 42 are functionally similar to the distributed key management agents 41 but typically utilize different code and messages in order to accommodate the different characteristics of mainframes 14. Each mainframe key management agent 42 preferably includes, in addition to one or more software modules, a common library (not shown) used for logging and configuration purposes, a cryptographic library (not shown) and a local property or configuration file (not shown). Each mainframe key management agent 42, which may be developed in the computer languages C and Assembler, communicates locally with its own property file and a key database such as the Integrated Cryptographic Services Facility ("ICSF") VSAM database. The functionality between the mainframe key management agent 42 and the key management server 30 involves commands sent to the key management server 32, providing the key management server 32 with results from key management server-sent instructions. It also performs maintenance on the ICSF database as instructed by the key management server 32. The interface between each mainframe key management agent 42 and the key management server 32 is based on XML messages sent between the two components, where each connection is secured by sockets with an encrypted payload. A common library suitable for use with the preferred embodiments of the present invention may be easily developed by one of ordinary skill in the art. A cryptographic library suitable for use with the preferred embodiments of the present invention is RSA Security's cryptographic library.

A number of commands may be sent from the key management server 32 to the key management agent system 40. For example, "ping" is a command that requests the key management agent 41, 42 receiving the message to respond regarding its health to determine whether or not the key management agent system 40 is functioning properly or not; "data key" is a command that instructs the key management agent system 40 to load the provided keys into the appropriate application key stores 31; "full key list" is a command that sends all the currently assigned keys 22 to the key management agent system 40; "delete key" is a command that instructs the key management agents 41, 42 to delete the specified key 22 from the appropriate application key store 31; "set current key" is a command that instructs the key management agent system 40 to set the assigned key 22 as the "current" key for the specified application.

A more limited number of commands may be sent from the key management agent system 40 to the key management server 32. For example, "startup" is a command that a KMA 41, 42 sends to the key control system 30 saying that it was down and is restarting, thereby triggering the key control system 30 to send back a "full key list" message; and "reverse ping" is a command that tests the communications channel originating from the key management agent system 40 going to the key control system 30, where the key management agent system 40 opens a client socket to the key control system 30 and tests that a "startup" message would be successful (i.e., that communication would not be blocked by a firewall or other computer network restriction).

The foregoing commands are all useful for handling keys 22 of both symmetric and asymmetric types and for monitoring overall system status. However, unlike symmetric keys 22, asymmetric keys 22 may not be transmitted from the key control system 30 to distributed key management agents 41 without a valid certificate. This is because the SSL and other conventional transport standards, which are preferably used for communications between the key control system 30 and the KMAs 41, 42, currently require the use of an individualized valid certificate, known for example as an "X509 certificate" in the SSL standard, that has been verified by a trusted certificate authority ("CA") 18.

The operation of certificates is well known in the art, but for exemplary purposes, the use of an X509 certificate in the system 20 of the present invention is next explained. As is well known, an X509 certificate can be identified by its distinguished name (its "DN") and other configurable attributes as well as by a digital signature that must be verified by the trusted CA 18. In addition to the X509 certificate date validation, the key control system 30 and the distributed KMAs 41 require that the peer certificate of the SSL connection have a specific DN. Because of these three requirements (date, DN and signature validation), a KMA's certificate may become invalid through date expiration or a mismatch of the expected DN, actual DN or expected CA. If any of these occur, intervention is required to generate a new RSA key pair, used just for authentication purposes; submit the public key to the CA 18, resulting in a new X509 certificate; update the KMA 41 with the new private key and X509 certificate; and update the key control system 30 with the new X509 certificate, associating it with the necessary KMA 41.

Although this manual intervention may be carried out if necessary, the system 20 of the present invention preferably allows the certificates to be renewed automatically. This may be accomplished as follows. First, the key control system 30 determines that a particular KMA certificate is due to expire and sends a "renew system certificate" message to the corresponding KMA 41. The renew system certificate message triggers the KMA 41 to attempt to renew its system certificate based upon the information provided in the message. The KMA 41 begins this process by generating a new asymmetric key pair of size dictated by the system certificate message from the key control system 30. This key pair is not an application key 22 but instead is used to provide security for the authentication process between the KMA 41 and the key control system 30. The KMA 41 adds this new private key to an authentication key store which is a data structure for securing keys (not shown) that is preferably separate from the application key stores 31 and stores the updated key store in a conventional storage device, such as the system hard drive of the distributed server 13. In addition, the KMA 41 will wrap the new public key and a certificate-signing request in a "system certificate request" message. The certificate-signing request is preferably in an industry standard form, such as the well-known PKCS10 format. The KMA 41 also adds attribute insertions into the system certificate request message by querying the distinguished name of its current certificate from the properties file, which is a configuration file, of the KMA 41. Assuming all steps are completed successfully, the KMA 41 transmits the system certificate request message to the key control system 30 and, because the private key has been stored in the key store on the system hard drive, destroys the in-memory copy of the private key. On the other hand, if any problems occur, then the KMA 41 instead responds to the key control system 30 with an appropriate error message.

Upon receiving a certificate signing request message from a KMA 41, the key control system 30 will send the certificate-signing request to the CA 18 for signing. The CA 18 signs and returns a certificate for the requesting KMA 41 to the key control system 30. When the key control system 30 receives this certificate, it generates a "system certificate response," directed to the requesting KMA 41, that forwards the signed public key (for example, an X509 certificate) received from the CA 18 to the KMA 41 to be inserted into the KMA's authentication key store. The system certificate response also specifies the certificate chains of the certificate that the KMA 41 should trust. The certificate chains will be inserted into the new authentication key store under aliases provided by the KMS 32. The private key, which corresponds to the new certificate, is retrieved from the KMA's current key store on the system hard drive. Upon receiving the new certificate, the KMA 41 creates a second new authentication key store comprising the certificate and the private key, and encrypts the second new authentication key store under a new password. The KMA 41 then writes this second new authentication key store to the system hard drive, or other conventional storage device, overlaying its current key store. Finally, the KMA 41 then resets its SSL server port and replies to the key control system 30 with a success or failure message, as appropriate.

Once a new certificate is activated on a KMA 41 and properly registered with the key control system 30, the key control system 30 may begin using the certificate when distributing application keys 22 to that KMA 41. This process is generally similar to that used to distribute symmetric keys 22, but requires communication between the two components to be authenticated using the new certificate.

An advantage of the system of the present invention over existing systems using asymmetric keys, for example, is that the system of the present invention supports rotation of asymmetric keys used for encryption as well as asymmetric keys used for authentication such as with a certificate authority. Thus, there may be two distinct uses for asymmetric keys within the system of the present invention, namely authentication and encryption. With asymmetric keys used for authentication, if the asymmetric keys are to become lost or corrupted, a new key set can be generated and used in place of the original key set. Thus, the asymmetric keys are not required to be escrowed when used for authentication. In contrast, asymmetric keys used for encryption are used to encrypt data. If these asymmetric keys are lost, the corresponding encrypted data is lost. Thus, asymmetric keys used for this encryption purpose must be escrowed.

The key management processes described above are used to load keys 22 into the key stores 31 for retrieval by the applications 16. However, the key system API 50 provides the only means by which the various applications 16 interface with the system 20. The key system API 50 functions like a conventional API in that it may be used by any application 16 to interface with the system 20. The functionality of the key system API 50 includes, but is not limited to, retrieving an application's current symmetric key, retrieving a specific symmetric key, and retrieving a property value such as a database password stored in the key store 31. In addition, although not required for embodiments of the automated system 20 of the present invention that provide only symmetric key functionality, the key system API 50 preferably also includes the ability to retrieve an application's current and specified public/private (asymmetric) key. Preferably, the key system API 50 is developed in a conventional version of Java or the like, such as Java version 1.2 or greater or Microsoft-.Net (C#), with the particular language being selected based on its system implementation. The key system API 50 utilizes only files stored on the local file system. The Java versions utilize a cryptographic library such as one available from RSA Security. The interface to the respective key store 31 is based on language-specific file input/output ("I/O"). An application 16 of the system 20 utilizes the key system API 50 to use a key system API-specific command to retrieve a value from the corresponding key store 31 of the API 50, whether it is to retrieve a symmetric key, an asymmetric key, or a key property from the key store 31. The key system API 50 is not used to access automated key management system-provided keys from a mainframe 14.

The administrative interface ("KAdmin") 60 provides the administrator for the system with a user's interface to the automated key management system 20 (other means include database queries using a conventional database query language such as SQL). Among the purposes of the administrative interface 60 are to provide detailed key management agent system 40 information and other key information including, but not limited to, detailed key management agent information such as last communication, assigned keys (applications), version information, and the like; to provide the ability to maintain a key management agent system 40 by "pinging", deleting (unregistering), suspending/unsuspending, managing applications (keys) for the key management agent system 40, editing values, and the like; to provide the ability to add to or register a new key management agent system 40 to the automated key management system 20; to provide detailed key information including which key management agent systems 40 are using specified keys; to provide the ability to delete, refresh, or extract keys; to provide the ability to add new key series to the automated key management system 20; to provide the ability to view key management server 32 logs; and the like. The administrative interface 60 is preferably developed in Java version 1.4 or greater and utilizes WebSphere Application Server version 5.1, an Oracle database (which stores automated key management system-related data), a common library (not shown) used for logging and configuration purposes, and a local property or configuration file. The administrative interface 60 interfaces with the key management server 32 and is based on XML messages sent between the two components, where each connection is secured by SSL. The administrative interface 60 also interfaces with an Oracle database, where each session is secured IPSec, and a web browser where each session is secured by SSL. The functionality of the administrative interface 60 involves establishing an SSL session and authenticating the user via a browser certificate communication, communicating with the Oracle database to retrieve requested automated key management system data, and communicating with the key management server 32 to update the automated key management system data and/or key management agent systems.

As indicated above, the automated key management system 20 of the present invention has the capability of using both symmetric and asymmetric keys 22. For symmetric keys 22, such as AES, 3DES, or the like, each key 22 is identified by a key label. One suitable format for such key labels may be described using the following example:
KLAB.CD.AKEY.NULL.CONF.5434
In this exemplary key label format, "KL" is a constant; "AB" is an application ID for the receiver (decryptor) application 16; "CD" is an application ID for the sender (encryptor) application 16; AKEY is the key's level, which in one embodiment may have one value when the key is being used for test purposes, another value when being used in production, and is used mainly for, for example, RACF privileges on mainframe-type machines 14; "NULL" is the device for which this key is valid and, if NULL, indicates that all instances of the encrypting application will use the same data key; "CONF" is the key type (in one embodiment, valid key types may be "CONF" and "SIGN," where "CONF" key type represents a 3DES key, and the SIGN key type represents a hash-based authentication code ("HMAC") key); and "5434" is a key identifier and is used to indicate the version or iteration of the key.

A key descriptor is preferably also provided for each key 22. In one suitable format, the key descriptor is similar to the key label, but without the identifier on the end. For example, the key descriptor for the exemplary key label described above would be:
KLAB.CD.AKEY.NULL.CONF
The key descriptor is used by the encrypting application 16 to access the current data key 22.

A partial key label is preferably also provided for each key. In one suitable format, the partial key label is similar to the key label, but without the "KLxx," where "xx" is the decryptor's application ID. This label should be sent with the encrypted data to the decryptor. The decryptor will then concatenate "KLxx" and the partial key label to create the full key label. A routine available through the key system API 50 provides access to the partial key label.

The important distinction between the key label, the key descriptor and the partial key label is that the application 16 that is encrypting the data uses the key descriptor to access the data key 22. The encrypting application 16 then retrieves the partial key label for the data key 22 used in the encryption, and passes the encrypted data and partial key label to the decryptor. The decrypting application 16 then concatenates "KLxx" to the partial key label as specified above, and then uses the key label to access the appropriate data key 22.

The key system API 50 may be used in a Java environment as follows. Applications 16 needing to encrypt data first retrieve the current key from the Key System API 50, by passing in the key descriptor described above (i.e., KLAB.CD.AKEY.NULL.CONF). The data is encrypted using the corresponding key, and the encrypted data is sent to the decrypting application 16 together with the partial key label (CD.AKEY.NULL.CONF.5434). Code for encrypting the data may be easily developed by one of ordinary skill in the art.

Applications 16 needing to decrypt data first receive the encrypted data and the partial key label (CD.AKEY.NULL.CONF.5434) and then concatenate "KLxx." (xx is the decryptor's application ID) to the partial key label to get the key label (KLAB.CD.AKEY.NULL.CONF.5434). The application may then retrieve the appropriate data key 22 from the key system API 50 by passing the key label (same as previous), and decrypt the data using the key 22. Code for decrypting the data may likewise be easily developed by one of ordinary skill in the art.

For asymmetric keys 22, such as RSA, PKI, or the like, each key 22 is preferably identified to the key system API 50 by a key label, but this key label is preferably generally hidden from the user.

Figure 4:
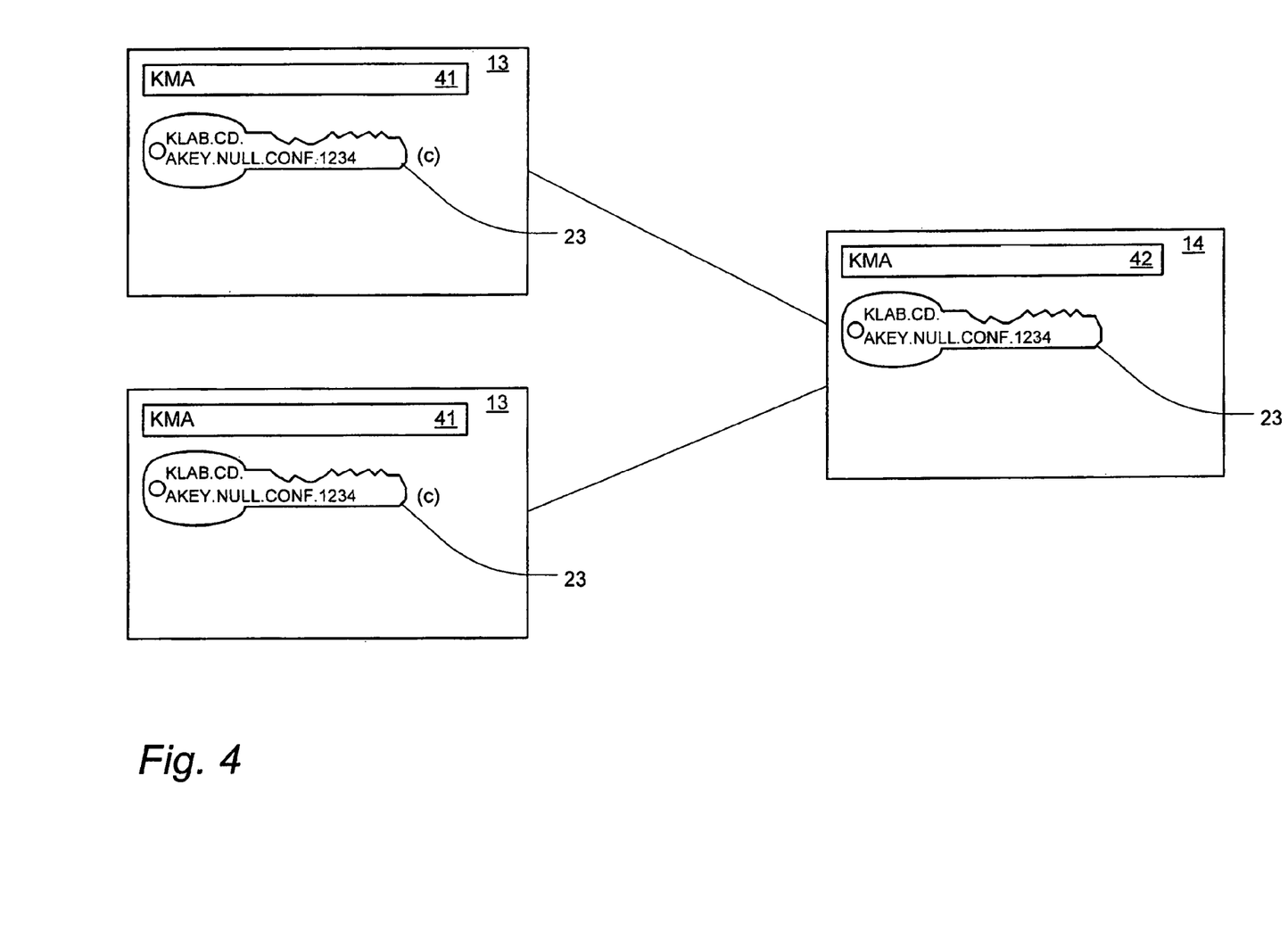
FIG. 4 is a graphical illustration of a exemplary system in which two servers and a mainframe are all using a first key.

The following shows the specific actions that take place during a key refresh, including the steps taken if a key management agent system 41 is down or unavailable. Key rotation is designed so that failures can occur during the process without affecting individual applications 16. FIG. 4 is a graphical illustration of a exemplary system in which two servers 13 and a mainframe 14 are all using a first key 23. In FIG. 4 and subsequent drawings, the key 23, 24 currently being used by a particular machine 13, 14 is marked by a "(c)". For example, as shown in FIG. 4, an "authentication"-type application, having an application ID of "AB," may be installed on two servers 13. For purposes of this example, the authentication application 16 will be considered to encrypt passwords and send them on to the corresponding part of the AB application 16 on the mainframe 14. Initially, all passwords are assumed to be in sync and using the KLAB.CD.AKEY.NULL.CONF.1234 key 23. It should be noted that in this example the mainframe key management agent 42 does not have a "current" key marked because the application 16 there is assumed to be a decrypting application 16. As discussed hereinabove, decrypting applications 16 expect to receive the key label that was used to encrypt the data. Then, the decrypting application can use the key system API 50 to retrieve the appropriate key 23, 24 for decryption.

Figure 5:
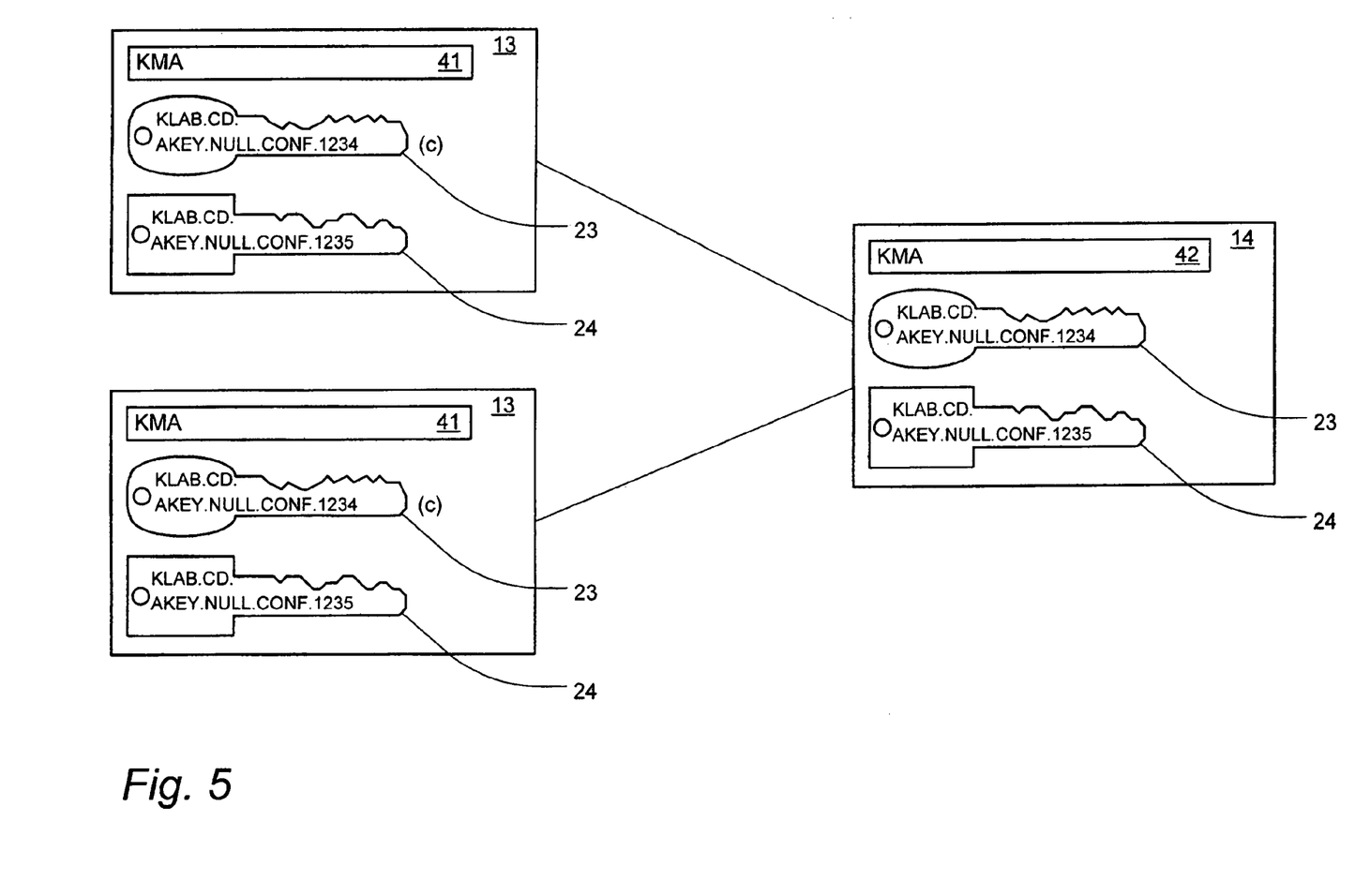
FIG. 5 is a graphical illustration of the exemplary system of FIG. 4 in which a second key has been distributed to the two servers and the mainframe.

When a decision is made to rotate the authentication ("AB") key (KLAB.CD.AKEY.NULL.CONF), the administrator uses the KAdmin 60 to instruct the key management server 32 to generate a new key 24 and push or distribute it to all applicable key management agents 41, 42. FIG. 5 is a graphical illustration of the exemplary system of FIG. 4 in which a second key 24 has been pushed to the two servers 13 and the mainframe 14. It should be noted that both Authentication-installed servers 13 are still encrypting with the original key 23 (because it is still "current").

Figure 6:
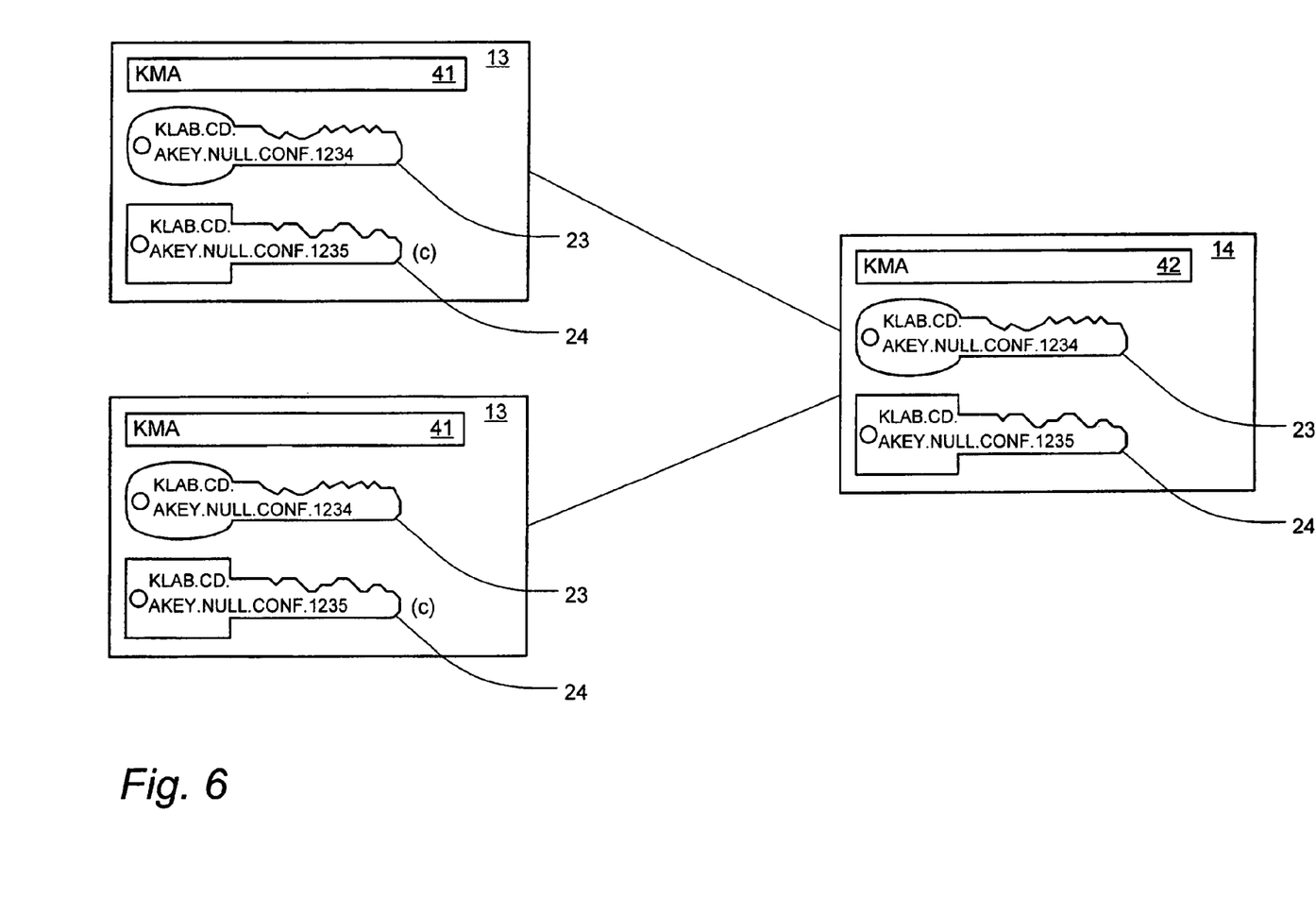
FIG. 6 is a graphical illustration of the exemplary system of FIG. 4 in which a second key has been made current in the two servers and the mainframe.

Next, the key management server 32 sends a message to the key management system 40 to set the new key 24 as current, resulting in the situation shown in FIG. 6. Now, the authentication applications 16 on both servers 13 are encrypting with the new key 24. Since the key label is sent with the encrypted data, the authentication application 16 on the mainframe 14 will be able to encrypt data with either key 23, 24 during the transition period.

Figure 7:
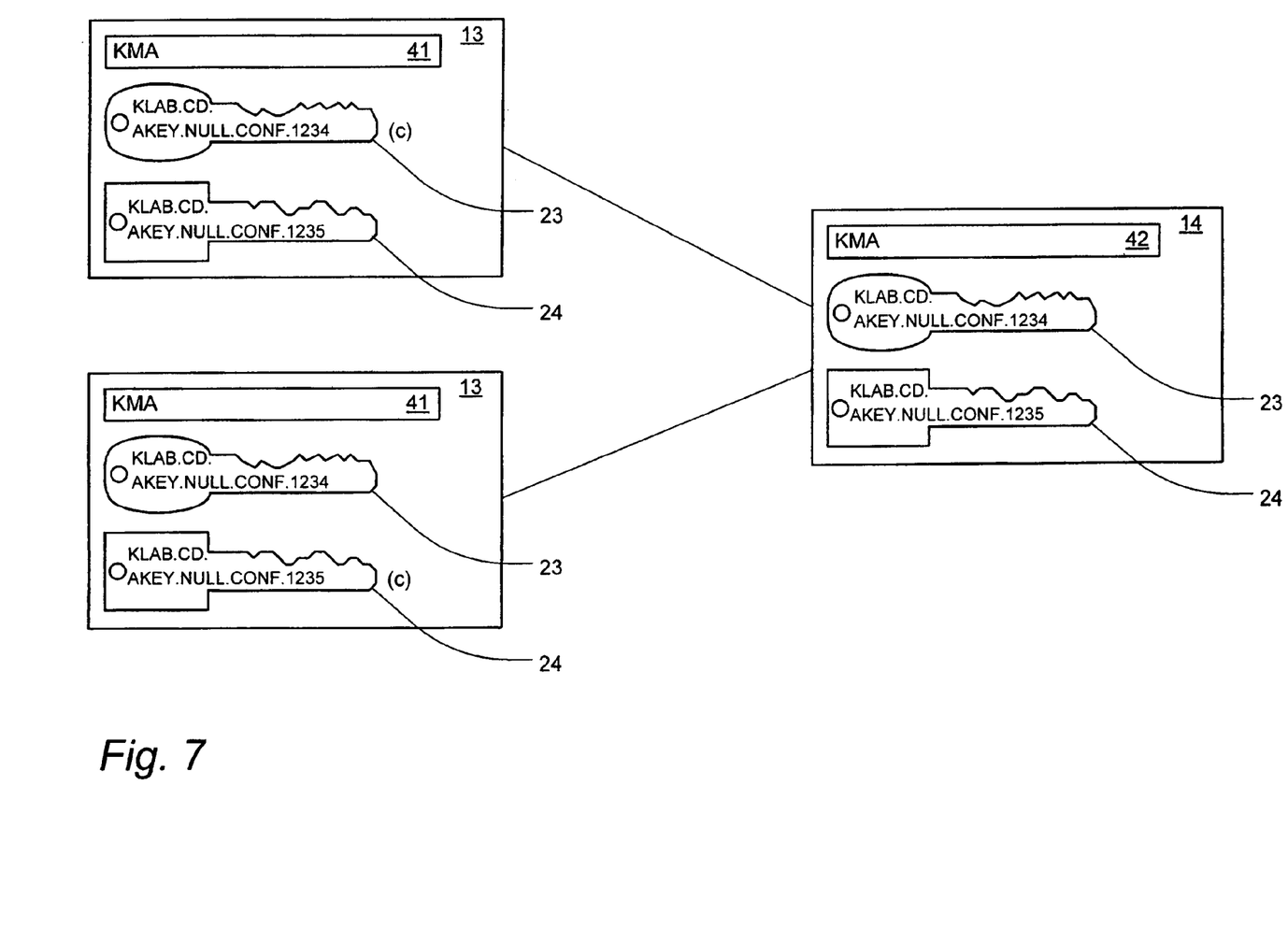
FIG. 7 is a graphical illustration of the exemplary system of FIG. 4 in which the second key has not yet been made current in the key management agent of one of the servers.

On the other hand, the key management agent system 41 in one of the servers 13 may be down when the key management server 32 sends the message to set the new key. FIG. 7 is a graphical illustration of the exemplary system of FIG. 4 in which the second key has not yet been made current in the key management agent 41 of one of the servers 13. It should be noted that the "AB" application 16 on the mainframe 14 will still be receiving traffic encrypted with key iterations 1234 and 1235. The mainframe 14 will handle this correctly because it still has access to both the old key 23 and the new key 24. In this case, the key rotation operation would halt, and the administrator would be notified via the KAdmin 60 of the failure of the key management agent 41 in the specified server 13. However, once the key management agent 41 of that server 13 is restarted, the new key 24 would be received and key iteration 1235 could become the current key.

The situation illustrated in FIG. 7 represents an important feature of the present invention. More particularly, as exemplified by this scenario, if during a key rotation a particular part of the system 20, such as a particular KMA 41, 42, the KMS 32, or a network connection between the key control system 30 and one or more of the KMAs 41, 42, were to fail, then middleware functions, mainframe applications and the like will continue to function and be able to encrypt and decrypt data. This is because keys 22 will only be triggered (set to "current") once they have been successfully distributed to all necessary machines 12. Preferably, the KMS 32 sends a first message with the keys 22 when the keys 22 are sent to each KMA 41, 42 and sends a second message to each KMA 41, 42 instructing each KMA 41, 42 to set the keys 22 to current when each KMA 41, 42 has successfully received the keys 22.

Figure 8:
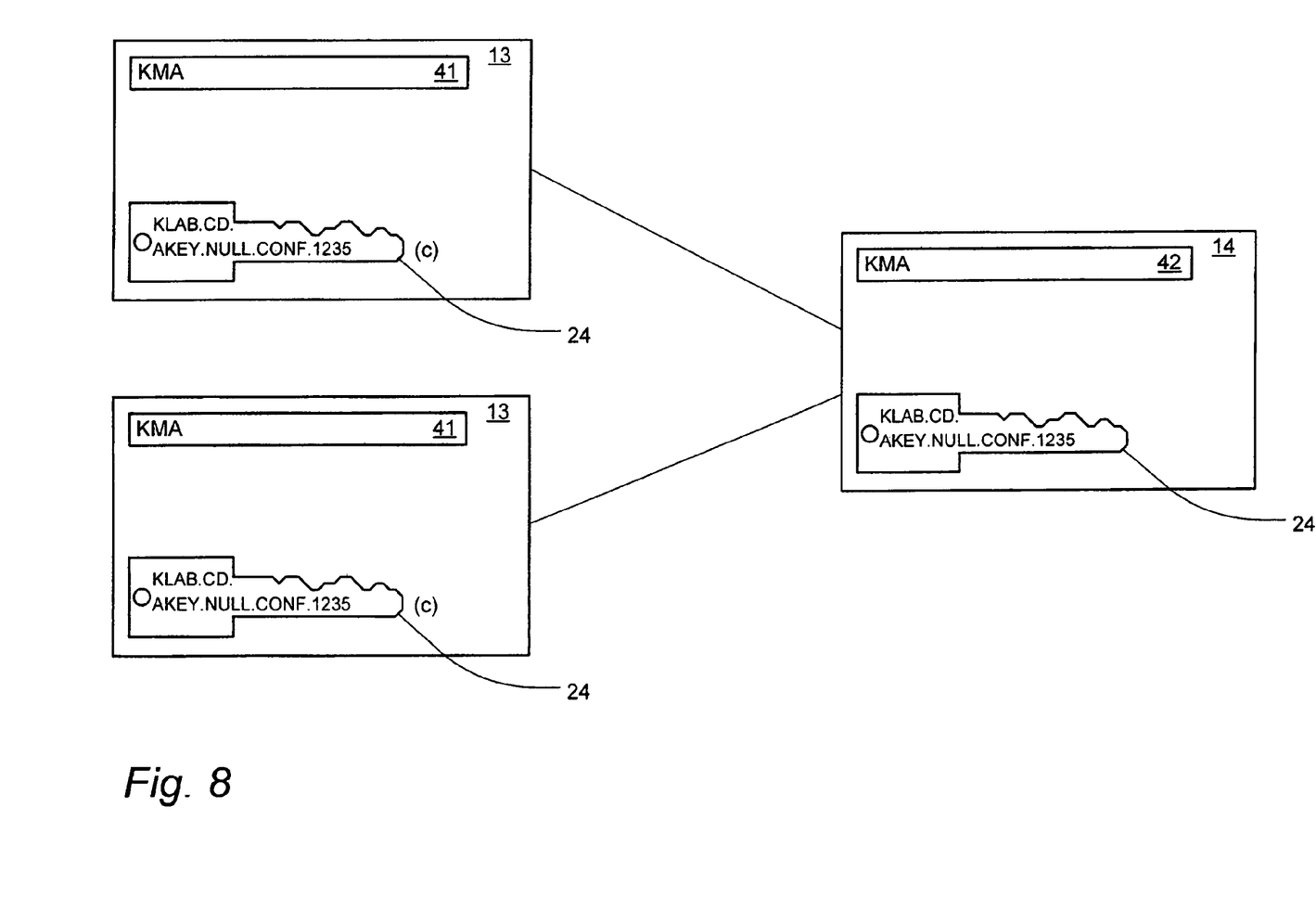
FIG. 8 is a graphical illustration of the exemplary system of FIG. 4 in which the first key has been deleted from the two servers and the mainframe.

Once the new key 24 has been successfully pushed to all necessary key management agents 41, 42, the administrator can use the KAdmin 60 to instruct the key management server 32 to send the "delete key" command to the key management agents 41, 42, thus removing the old key 23. FIG. 8 is a graphical illustration of the exemplary system of FIG. 4 in which the first key 23 has been deleted from the two servers 13 and the mainframe 14.

Based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

What is claimed is:

1. A key management agent system in a computer network, the system comprising:
    a centralized key control system that automatically generates and distributes asymmetric cryptographic keys for use by software applications in the computer network, the key control system including a key management server computer;
    an administrative server interface, providing a user interface to the key management agent system, that is communicatively connected to the key control system;
    at least one key management agent disposed on a computing machine communicatively connected to the key control system and arranged to receive at least one of the asymmetric cryptographic keys directly from the key control system wherein the at least one asymmetric key is identified by a key label, with the key label for use in rotation of asymmetric keys for encryption and in rotation of asymmetric keys for authentication; and
    at least one key store communicatively connected to the key management agent and automatically loaded with the at least one asymmetric cryptographic keys as directed by the key control system,
    wherein the key management system provides for rotation and distribution of asymmetric cryptographic keys by having the administrative server interface instruct the key management server of the key control system to generate a new cryptographic key and to distribute the new cryptographic key to at least one of the key management agents with a message to only set the new cryptographic key as current once the new cryptographic key has been successfully received by all necessary key management agents.

2. The key management agent system as claimed in claim 1, wherein the key store of the key management agent system is adapted to be read by an application program interface of at least one of the software applications.

3. A key control system for cryptographic asymmetric application keys for use within an automated key management system comprising at least one key management agent, the key control system comprising:
    a collection of key data, the key data including a plurality of asymmetric cryptographic application keys for use in facilitating secure communication in the automated key management system,
    a cryptographic key database system for storing at least a portion of the key data including encrypted asymmetric application keys,
    a key management server computer communicatively connected within the automated key management system and arranged to automatically generate an asymmetric application key and store the asymmetric application key in the cryptographic key database system, wherein the asymmetric application key is identified by a key label, with the key label for use in rotation of asymmetric keys for encryption and in rotation of asymmetric keys for authentication, and
    a message to only set the asymmetric application key as current once the asymmetric application key has been successfully received by all necessary key management agents.

4. The key control system as claimed in claim 3, the key control system further comprising:
    a secure hardware device communicatively connected into the automated key management system for storing one or more master keys that are used to scramble or descramble asymmetric application keys or intermediate keys to asymmetric application keys.

5. A method of distributing asymmetric cryptographic keys automatically by a key control system in an automated key management system, the method comprising:
    at the key control system, receiving instructions from an administrative interface to distribute an asymmetric cryptographic key to a key management agent, wherein the asymmetric cryptographic key is identified by a key label, with the key label for use in rotation of asymmetric keys for encryption and in rotation of asymmetric keys for authentication;
    automatically distributing without manual intervention the asymmetric cryptographic key to the key management agent via a secure interface; and
    automatically loading, without manual intervention, the asymmetric cryptographic key into a key store for independent retrieval by an application programming interface of an unrelated software application, and
    instructing the key management agent by the key control system to only set the asymmetric cryptographic key as current once all necessary key management agents have successfully received the asymmetric cryptographic key.

6. The method as claimed in claim 5, further comprising:
    receiving instructions by the key control system from an administrative interface to generate asymmetric cryptographic keys.

7. A method for securely transmitting a cryptographic application key from a first computing device to a second computing device using a certificate having an expiration date, the method comprising:
    assessing the expiration date of the certificate of the second computing device, based upon the assessment, generating, by the second computing device, an authentication key pair having a public key and a private key, wrapping the public key in a system certificate request message by the second computing device, transmitting the system certificate request message from the second computing device to the first computing device, sending the system certificate request from the first computing device to a certificate authority, at the first computing device, receiving, from the certificate authority, a signed certificate that comprises the public key signed by the certificate authority, forwarding the signed public key from the first computing device to the second computing device, and distributing a cryptographic application key from the first computing device to the second computing device using the signed public key to authenticate the distribution, and instructing to only set the cryptographic application key as current once the cryptographic application key has successfully been received by the second computing device.

8. The method as claimed in claim 7, wherein assessing the expiration date includes determining that the certificate of the second computing device is due to expire.

9. The method as claimed in claim 8, wherein the assessment is carried out by the first computing device.

10. The method as claimed in claim 7, wherein the first computing device includes a key control system for distributing cryptographic application keys and the second computing device includes a key management agent for receiving cryptographic application keys from the key control system and storing them on the second computing device.

11. The method as claimed in claim 10, further comprising:
sending a renew certificate message from the key control system to the key management agent, and
receiving the renew certificate message by the key management agent.

12. The method as claimed in claim 10, further comprising adding the private key of the authentication key pair to an authentication key store.

13. The method as claimed in claim 10, further comprising, upon receiving the certificate:
retrieving the private key corresponding to the certificate from the authentication key store,
creating a second authentication key store comprising the certificate and the private key, and
encrypting the second authentication key store.

14. A method for automatically rotating cryptographic keys in an automatic key management system having a key control system for generating and distributing asymmetric cryptographic keys to a first computing device communicatively connected to a second computing device, the method comprising:
storing a first cryptographic key having a first key label to a first computing device,
storing the first cryptographic key to a second computing device,
using the first cryptographic key to facilitate communication between the first and second computing devices,
distributing by the key control system a second cryptographic key having a second key label to the first and second computing device,
sending a message by the key control system to set the second cryptographic key as current with the second key label attached,
replacing the first cryptographic key with the second cryptographic key in the first computing device,
maintaining the first cryptographic key at the second computing device, thereby facilitating communication between the first and second computing devices using the first cryptographic key wherein the communication occurs without interruption, until it is determined that the replacement has been successfully completed, and
using the second cryptographic key to facilitate communication between the first and second computing devices upon determining that the first computing device has successfully replaced the first cryptographic key with the second cryptographic key.

15. The method according to claim 14, wherein the first computing device is a server, mainframe or other computing machine.

16. The method according to claim 14, wherein the second computing device is a server, mainframe or other computing machine.

17. The method as claimed in claim 14, wherein the first and second cryptographic keys are asymmetric.

18. The method as claimed in claim 14, wherein the first and second cryptographic keys are symmetric.

19. The method as claimed in claim 14, wherein the first and second cryptographic keys comprise key labels.

20. A method for automatically rotating cryptographic keys in an automatic key management system, the method comprising:
providing first and second computing devices, the first computing device including a key control system and the second computing device including a software application installed thereon and a data file, the software application operating independently from the key control system,
loading a first cryptographic key having a first key label into the data file in the second computing device,
using the first cryptographic key in the software application,
after using the first cryptographic key in the software application, automatically distributing without manual intervention a second cryptographic key having a second key label to the second computing device via a secure interface,
automatically loading, without manual intervention, the second cryptographic key into the data file for independent retrieval by the software application, and
using the second cryptographic key, as a replacement for the first cryptographic key, in the software application upon determining that the first cryptographic key has been successfully replaced with the second cryptographic key loaded into the data file.

* * * * *